(12) United States Patent
Benkreira et al.

(10) Patent No.: US 11,790,910 B2
(45) Date of Patent: *Oct. 17, 2023

(54) INTERACTING WITH A USER DEVICE TO PROVIDE AUTOMATED TESTING OF A CUSTOMER SERVICE REPRESENTATIVE

(71) Applicant: Capital One Services, LLC, McLean, VA (US)

(72) Inventors: Abdelkadar M'Hamed Benkreira, Washington, DC (US); Joshua Edwards, Philadelphia, PA (US); Michael Mossoba, Arlington, VA (US); Alexandra Colevas, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 249 days.

This patent is subject to a terminal disclaimer.

(21) Appl. No.: 17/302,660

(22) Filed: May 10, 2021

(65) Prior Publication Data

US 2021/0264918 A1   Aug. 26, 2021

Related U.S. Application Data

(63) Continuation of application No. 16/688,442, filed on Nov. 19, 2019, now Pat. No. 11,011,173, which is a (Continued)

(51) Int. Cl.
*G10L 15/22* (2006.01)
*H04M 3/22* (2006.01)
(Continued)

(52) U.S. Cl.
CPC .............. *G10L 15/22* (2013.01); *G06N 20/00* (2019.01); *G06Q 10/06398* (2013.01);
(Continued)

(58) Field of Classification Search
CPC ................ G10L 15/22; H04M 3/5175; H04M 2203/401–403
See application file for complete search history.

(56) References Cited

U.S. PATENT DOCUMENTS 5,535,256 A   7/1996   Maloney et al.
6,324,282 B1   11/2001   McIllwaine et al.
(Continued)

OTHER PUBLICATIONS

Leviathan Y., et al., "Google Duplex: An AI System for Accomplishing Real-World Tasks over the Phone," May 8, 2018, 13 pages, Retrieved from the internet [URL: https://ai.googleblog.com/2018/05/duplex-ai-system-for-natural-conversation.html].
(Continued)

*Primary Examiner* — Jialong He
(74) *Attorney, Agent, or Firm* — Harrity & Harrity, LLP

(57) ABSTRACT

A device obtains information concerning a plurality of customer service representatives to identify a customer service representative and a user device associated with the customer service representative. The device selects a test issue of a plurality of test issues to be presented to the customer service representative, and, based on the test issue, a virtual assistant to converse with the customer service representative. The device initiates, based on an availability of the user device, a communication session with the user device, and causes the virtual assistant to converse with the customer service representative regarding the test issue. The device obtains data concerning a performance of the customer service representative during the communication session, processes the data using a machine learning model to determine a performance score for the customer service representative, and causes, based on the performance score for the customer service representative, at least one action to be performed.

20 Claims, 8 Drawing Sheets

Related U.S. Application Data continuation of application No. 16/263,974, filed on Jan. 31, 2019, now Pat. No. 10,490,191.

(51) Int. Cl.

| | | |
|---|---|---|
| *G06Q 30/016* | (2023.01) | |
| *G06N 20/00* | (2019.01) | |
| *G10L 15/16* | (2006.01) | |
| *G06Q 10/0639* | (2023.01) | |
| *G10L 15/26* | (2006.01) | |

(52) U.S. Cl.
CPC ............ *G06Q 30/016* (2013.01); *G10L 15/16* (2013.01); *G10L 15/26* (2013.01); *H04M 3/22* (2013.01)

(56) References Cited

U.S. PATENT DOCUMENTS

| | | |
|---|---|---|
| 6,721,706 B1 | 4/2004 | Strubbe et al. |
| 10,490,191 B1 | 11/2019 | Benkreira et al. |
| 11,011,173 B2 | 5/2021 | Benkreira et al. |
| 2010/0332287 A1 | 12/2010 | Gates et al. |
| 2014/0108583 A1* | 4/2014 | Kulkarni ............... H04L 43/50 709/206 |
| 2014/0244712 A1* | 8/2014 | Walters ................. G06Q 30/02 709/202 |
| 2014/0270109 A1 | 9/2014 | Riahi et al. |
| 2015/0088514 A1 | 3/2015 | Typrin |
| 2015/0186154 A1 | 7/2015 | Brown et al. |
| 2016/0099892 A1 | 4/2016 | Palakovich et al. |
| 2016/0189558 A1 | 6/2016 | McGann et al. |
| 2016/0191712 A1 | 6/2016 | Bouzid et al. |
| 2016/0308799 A1 | 10/2016 | Schubert et al. |
| 2018/0091654 A1 | 3/2018 | Miller et al. |
| 2018/0096278 A1 | 4/2018 | Lev-Tov et al. |
| 2019/0058793 A1 | 2/2019 | Konig et al. |
| 2019/0109803 A1* | 4/2019 | Akkiraju ............... G09B 5/02 |
| 2019/0251859 A1* | 8/2019 | Xu ........................ G09B 7/02 |

OTHER PUBLICATIONS

Xuetao M., et al., "Impact of Agent's Answers Variability On Its Believability and Human-likeness and Consequent Chatbot Improvements." Proceedings of AISB, Apr. 2009, 21 pages.

* cited by examiner

INTERACTING WITH A USER DEVICE TO PROVIDE AUTOMATED TESTING OF A CUSTOMER SERVICE REPRESENTATIVE

RELATED APPLICATIONS

This application is a continuation of U.S. patent application Ser. No. 16/688,442, filed Nov. 19, 2019 (now U.S. Pat. No. 11,011,173), which is a continuation of U.S. patent application Ser. No. 16/263,974, filed Jan. 31, 2019 (now U.S. Pat. No. 10,490,191), the contents of which are incorporated herein by reference in their entireties.

BACKGROUND

An interactive voice response system (IVR), a virtual assistant, and/or the like can communicate with a person regarding one or more topics, issues, and/or the like. The IVR, virtual assistant, and/or the like can generate voice data, text data, video data and/or the like to converse with the person.

SUMMARY

According to some implementations, a method may include obtaining, by a device, information concerning a plurality of customer service representatives, and identifying, by the device, a customer service representative of the plurality of customer service representatives based on the information concerning the plurality of customer service representatives. The method may include selecting, by the device and based on information concerning the customer service representative included in the information concerning the plurality of customer service representatives, a test issue of a plurality of test issues to be presented to the customer service representative. The method may include selecting, by the device and based on the test issue and the information concerning the customer service representative, a virtual assistant of a plurality of virtual assistants for conversing with the customer service representative, wherein the virtual assistant has one or more voice characteristics that are different from one or more voice characteristics of another virtual assistant of the plurality of virtual assistants. The method may include initiating, by the device and based on an availability of the customer service representative, a communication session with a user device associated with the customer service representative, and causing, by the device and based on the test issue, via the virtual assistant, a communication with the user device via the communication session. The method may include obtaining, by the device, a plurality of data points relating to a performance of the customer service representative during the communication session, processing, by the device and using a machine learning model, the plurality of data points to determine a performance score of the customer service representative, and sending, by the device, training information to the user device when the performance score does not satisfy a threshold.

According to some implementations, a device may include one or more memories, and one or more processors, communicatively coupled to the one or more memories, to obtain information concerning a plurality of test issues, and to select a test issue of the plurality of test issues based on the information concerning the plurality of test issues. The one or more processors may obtain information concerning a plurality of user devices associated with a plurality of customer service representatives, wherein the information concerning the plurality of user devices includes a respective measure of availability of each of the plurality of user devices. The one or more processors may determine, using a machine learning model and based on the test issue and the information concerning the plurality of user devices, scores for the plurality of user devices, and may select a user device based on the scores for the plurality of user devices. The one or more processors may select, based on the user device and the test issue, a virtual assistant to converse with a customer service representative associated with the user device, wherein the virtual assistant is one of a plurality of virtual assistants, and wherein the virtual assistant has one or more voice characteristics that are different from voice characteristics of another virtual assistant of the plurality of virtual assistants. The one or more processors may initiate a communication session with the user device, and may cause, based on the test issue and via the virtual assistant, a communication with the user device via the communication session. The one or more processors may obtain a plurality of data points relating to a performance of the customer service representative during the communication session, wherein the plurality of data points includes one or more data points concerning a sentiment of the customer service representative. The one or more processors may process the plurality of data points to determine a performance score for the customer service representative, and may cause training information to be sent to the user device when the performance score does not satisfy a threshold.

According to some implementations, a non-transitory computer-readable medium may store instructions that include one or more instructions that, when executed by one or more processors of a device, cause the one or more processors to obtain information concerning a plurality of customer service representatives, to identify a customer service representative of the plurality of customer service representatives based on the information concerning the plurality of customer service representatives, and to identify a user device associated with the customer service representative. The one or more instructions may cause the one or more processors to select a test issue of a plurality of test issues to be presented to the customer service representative, and to select, based on the test issue, a virtual assistant of a plurality of virtual assistants to converse with the customer service representative, wherein the virtual assistant has one or more voice characteristics that are different from one or more voice characteristics of another virtual assistant of the plurality of virtual assistants. The one or more instructions may cause the one or more processors to initiate, based on an availability of the user device, a communication session with the user device, and to cause the virtual assistant to converse with the customer service representative regarding the test issue via the user device and the communication session. The one or more instructions may cause the one or more processors to obtain, based on the virtual assistant conversing with the customer service representative, data concerning a performance of the customer service representative during the communication session, to process the data using a machine learning model to determine a performance score for the customer service representative, and to cause, based on the performance score for the customer service representative, at least one action to be performed.

DETAILED DESCRIPTION

Figure 1A:
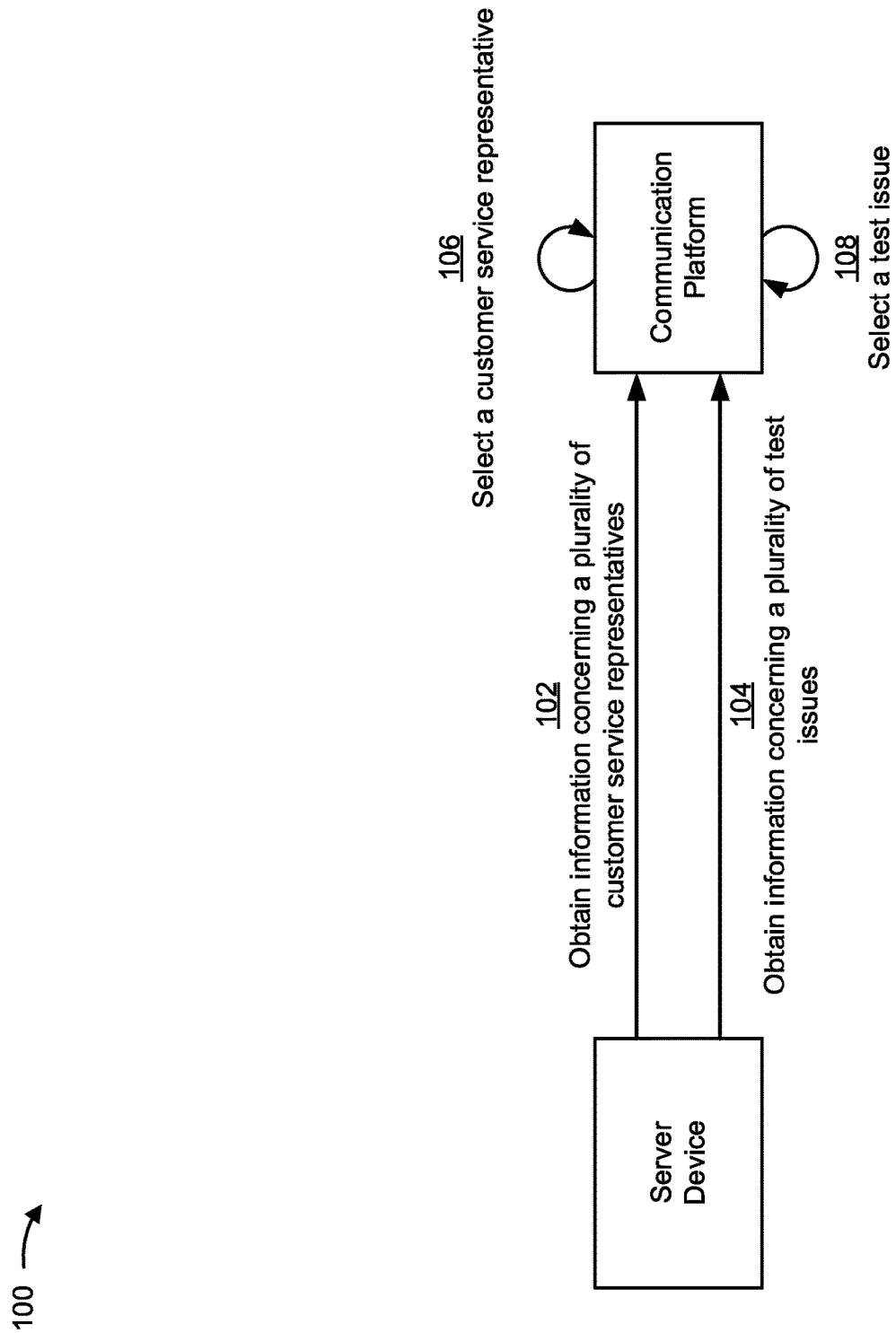
FIGS. 1A-1C are diagrams of example implementations described herein.

The following detailed description of example implementations refers to the accompanying drawings. The same reference numbers in different drawings may identify the same or similar elements.

In some instances, a person initiates, using a communication device, a communication session (e.g., the person calls a telephone number, initiates a chat session, initiates a video conference, and/or the like) with a customer service representative of an organization. In some cases, the person interacts with the customer service representative to obtain information (e.g., determine a balance of a financial account) and/or to cause an action to be performed (e.g., transfer money between financial accounts). However, the customer service representative, using a user device to communicate with the communication device of the person, may not provide good customer service (e.g., the customer service representative is not able to help the person obtain the information or cause the action to performed, the customer service representative puts the communication session on hold, the customer service representative provides irrelevant information to the person, the customer service representative causes an undesired action to be performed, and/or the like).

This may increase a likelihood that the communication session will last longer to accommodate additional communication between the person and the customer service representative. This may also increase a likelihood that the person will terminate the communication session (e.g., hang up the call), which may cause the user to call the organization one or more additional times to try to avoid interacting with the same customer service representative. This may unnecessarily consume resources (e.g., memory resources, power resources, communication resources, and/or the like), such as communication device resources, network resources, and user device resources to support the additional communication and/or the person placing multiple calls. Moreover, the communication device resources, the network resources, and the user device resources may be unnecessarily used to facilitate a call that will ultimately be terminated before the person accomplishes the goal of the call.

According to some implementations described herein, a communication platform obtains information concerning a plurality of customer service representatives, information concerning a plurality of user devices, information concerning a plurality of test issues, and/or the like. In some implementations, the communication platform selects a customer service representative and a test issue to be presented to the customer service representative. In some implementations, the communication platform selects a virtual assistant, of a plurality of virtual assistants, to converse with the customer service representative regarding the test issue. In some implementations, the communication platform initiates a communication session with a user device of the customer service representative and communicates, based on the test issue, with the customer service representative. In some implementations, the communication platform obtains data relating to a performance of the customer service representative during the communication session and processes the data using a machine learning model to determine a performance score of the customer service representative. In some implementations, the communication platform causes at least one action to be performed based on the performance score, such as sending training information to the user device when the performance score does not satisfy a threshold.

In this way, the communication platform reduces a demand for resources (e.g., memory resources, power resources, communication resources, and/or the like), such as communication device resources, user device resources, network resources and/or the like. For example, the communication platform may test a customer service representative concerning a test issue and provide, via the user device, training information to the customer service representative that improves the customer service representative's skills and abilities. This may increase a likelihood that the customer service representative will provide, to a person using a communication device, better customer service concerning the test issue and/or similar issues. In this way, the communication platform decreases a likelihood that a communication session will last longer than necessary and consume additional communication device resources, user device resources, network resources, and/or the like for a person and the customer service representative to communicate (e.g., regarding the test issue or the similar issues). Moreover, this decreases a likelihood that a person communicating with the customer service representative (e.g., regarding the test issue or the similar issues) will terminate the communication session (e.g., hang up the call) and subsequently initiate one or more new communication sessions that consume additional communication device resources, user device resources, network resources, and/or the like.

Figure 1B:
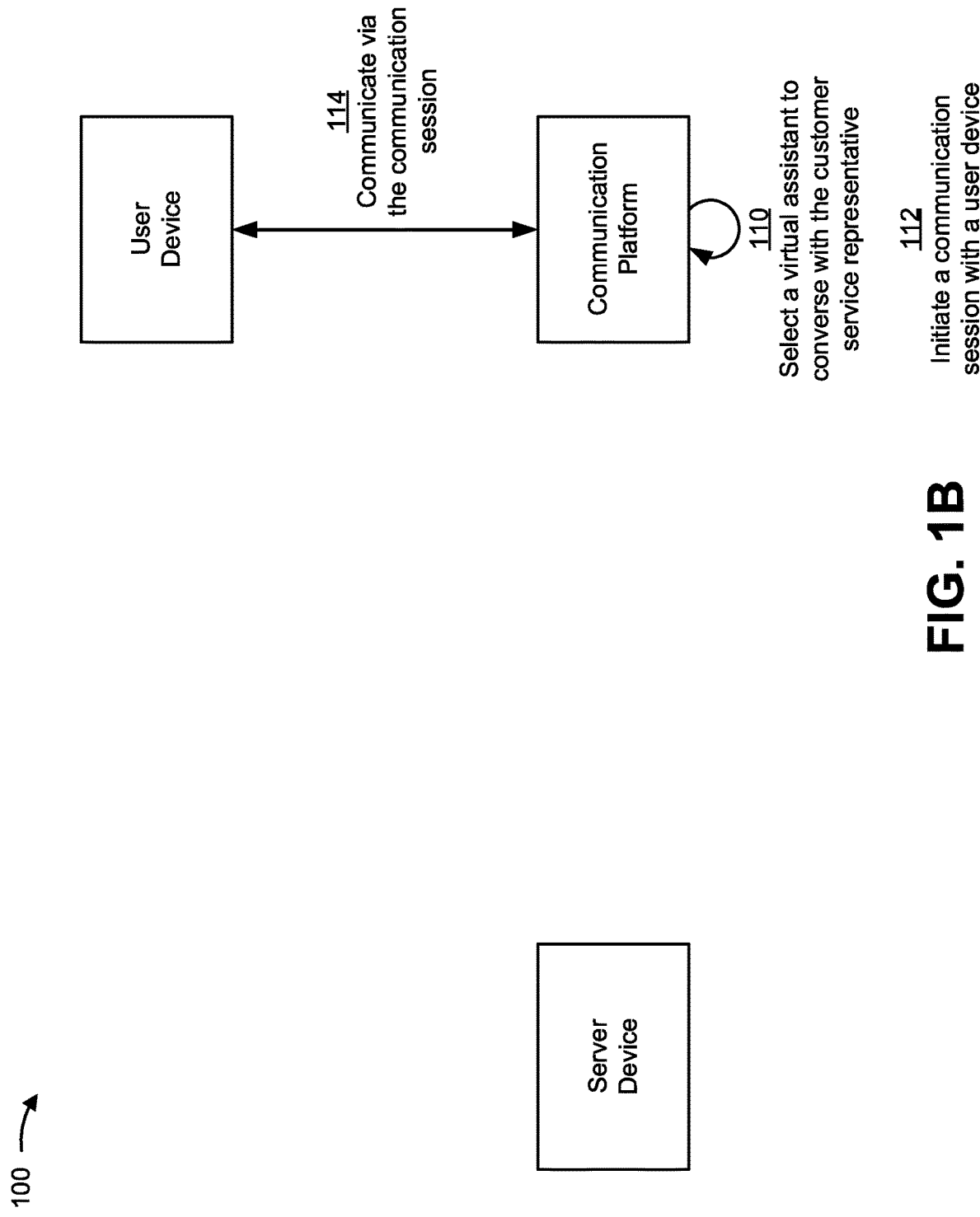
Figure 1C:
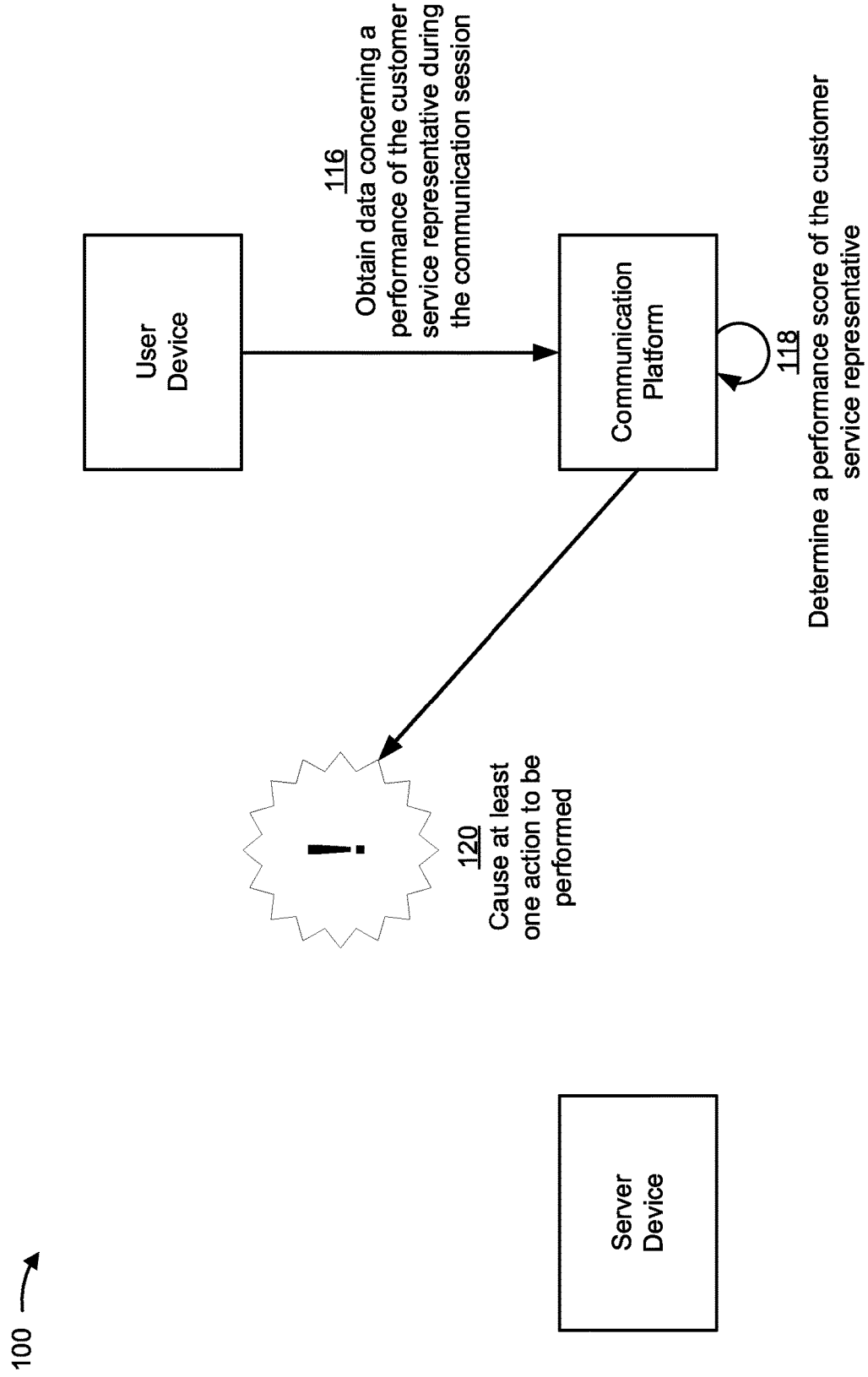

FIGS. 1A-1C are diagrams of an example implementation 100 described herein. As shown in FIGS. 1A-1C, example implementation 100 may include a server device, a user device, and/or a communication platform. The user device may be a communication and/or computing device, such as a mobile phone, a smartphone, a laptop computer, a tablet computer, and/or the like. The server device and the communication platform may be a computing device, a server, a cloud computing device, and/or the like. In some implementations, the server device, the user device, and/or the communication platform may be connected via a network, such as the internet, an intranet, and/or the like. Some example implementations described herein concern a single server device, user device, and/or communication platform, but implementations may include a plurality of server devices, user devices and/or communication platforms.

In some implementations, the user device and the communication platform may communicate via one or more communication sessions. The communication platform may include one or more interactive voice response systems (IVRs), one or more virtual assistants, and/or the like (hereinafter collectively referred to as the one or more "virtual assistants") to interact (e.g., communicate speech, such as voice data, text data, video data, and/or the like) with one or more customer service representatives of an organization. A customer service representative may use the user device to communicate with a virtual assistant, of the one or more virtual assistants, via the one or more communication sessions.

As shown in FIG. 1A and by reference number 102, the communication platform may obtain information concerning a plurality of customer service representatives associated with an organization, such as a company, a financial institution, a school, and/or the like from a server device. The information concerning the plurality of customer service representatives may include information concerning each customer service representative of the plurality of customer service representatives. For example, information concerning a customer service representative, of the plurality of customer service representatives, may include a measure of availability of the customer service representative (e.g., a time and/or time period when the customer service representative is available, a volume of calls the customer service representative is handling, and/or the like), test performance information (e.g., identification of one or more previous test issues presented to the customer service representative, information concerning a respective performance of the customer service representative related to a previous test issue of the one or more previous test issues, and/or the like), real-life performance information (e.g., identification of one or more previous real-life issues encountered by the customer service representative, information concerning a respective performance of the customer service representative related to a previous real-life issue of the one or more previous real-life issues (e.g., based on surveys, outcomes, and/or the like concerning the previous real-life issue)), and/or the like.

Additionally, or alternatively, the communication platform may obtain information concerning a plurality of user devices associated with the plurality of customer service representatives. The information concerning the plurality of user devices may include information concerning each user device of the plurality of user devices. For example, information concerning a user device, of the plurality of user devices, may include a measure of availability of the user device (e.g., a time and/or time period when the user device is available, a volume of calls the user device is handling, and/or the like), information identifying a customer service representative associated with the user device, the information concerning the customer service representative, and/or the like.

As shown by reference number 104, the communication platform may obtain information concerning a plurality of test issues. The information concerning the plurality of test issues may include information concerning each test issue. For example, information concerning a test issue may include information identifying the test issue, information on how to evaluate a performance concerning the test issue, and/or the like. A test issue may be one or more scenarios that a customer service representative might encounter, such as a hostile customer scenario, a bad actor scenario, a complicated transaction scenario, and/or the like.

As shown by reference number 106, the communication platform may select, identify, determine, and/or the like a customer service representative of the plurality of customer service representatives. In some implementations, the communication platform may select, identify, determine, and/or the like the customer service representative based on the information concerning the plurality of customer service representatives. For example, the communication platform may determine, based on the information concerning the plurality of customer service representatives, the respective measure of availability of each customer service representative of the plurality of customer service representatives, in order to select the customer service representative. The communication platform may select the customer service representative because the customer service representative is currently available, is available during a particular time interval, is handling a low volume of calls, and/or the like. In some implementations, the communication platform may identify, based on the information concerning the customer service representative, a user device associated with the customer service representative.

Additionally, or alternatively, the communication platform may select, identify, determine, and/or the like a user device of the plurality of user devices. In some implementations, the communication platform may select, identify, determine, and/or the like the user device based on the information concerning the plurality of user devices. For example, the communication platform may determine, based on the information concerning the plurality of user devices, the respective measure of availability of each user device of the plurality of user devices, and/or the like to select the user device. The communication platform may select the user device because the user device is currently available, is available during a particular time interval, is handling a low volume of calls, and/or the like. In some implementations, the communication platform may identify, based on the information concerning the user device, a customer service representative associated with the user device.

As shown by reference number 108, the communication platform may select, identify, determine, and/or the like a test issue of the plurality of test issues. In some implementations, the test issue is to be presented to the customer service representative (e.g., the customer service representative selected, identified, determined, and/or the like by the communication platform or the customer service representative associated with the user device selected, identified, determined, and/or the like by the communication platform). The communication platform may select, identify, determine, and/or the like the test issue based on the information concerning the plurality of test issues, the information concerning the customer service representative, and/or the information concerning the user device. For example, the communication platform may select the test issue because the information concerning the customer service representative and/or the information concerning the user device indicates that the test issue has not been presented to the customer service representative and/or the user device in a threshold amount of time (e.g., the test issue has not been presented within the past week, month, year, and/or the like).

In some implementations, the communication platform may select, identify, determine, and/or the like the test issue using a first machine learning model. In some implementations, the communication platform may generate and/or train the first machine learning model. For example, the communication platform may obtain historical information concerning the plurality of customer service representatives and/or historical information concerning the plurality of user devices (hereinafter collectively referred to as the "historical information") to generate and/or train the first machine learning model. In some implementations, the communication platform may process the historical information to train the first machine learning model to predict, for a customer service representative, respective scores concerning the plurality of test issues. A predicted score for a test issue, of the plurality of test issues, may indicate a predicted performance of the customer service representative concerning the test issue (e.g., a low predicted score may indicate a predicted poor performance, a high predicted score may indicate a predicted good performance, and/or the like).

In some implementations, the communication platform may perform a set of data manipulation procedures to process the historical information to generate the first machine learning model, such as a data preprocessing procedure, a model training procedure, a model verification procedure, and/or the like. For example, the communication platform may preprocess the historical information to remove filler words, long pauses, confidential data, and/or the like; to categorize words or phrases based on a customer service representative's emphasis; to replace personal information with generic information; and/or the like. In this way, the communication platform may organize thousands, millions, or billions of data entries for machine learning and model generation.

In some implementations, the communication platform may perform a training operation when generating the first machine learning model. For example, the communication platform may portion the historical information into a training set, a validation set, a test set, and/or the like. In some implementations, a minimum feature set may be created from preprocessing and/or dimensionality reduction of the historical information. In some implementations, the communication platform may train the first machine learning model on this minimum feature set, thereby reducing processing required to train the first machine learning model, and may apply a classification technique to the minimum feature set.

In some implementations, the communication platform may use a classification technique, such as a logistic regression classification technique, a random forest classification technique, a gradient boosting machine (GBM) classifier technique, and/or the like to determine a categorical outcome (e.g., that particular historical information is associated with a particular score for a particular test issue). Additionally, or alternatively, the communication platform may perform a recursive feature elimination procedure to split the data of the minimum feature set into partitions and/or branches, and use the partitions and/or branches to perform predictions (e.g., that particular historical information is associated with a particular score for a particular test issue). Based on using the recursive feature elimination procedure, the communication platform may reduce utilization of computing resources relative to manual, linear sorting and analysis of data points, thereby enabling use of thousands, millions, or billions of data points to train the first machine learning model, which may result in a more accurate first machine learning model than using fewer data points.

Additionally, or alternatively, the communication platform may use a support vector machine (SVM) classifier technique to generate a non-linear boundary between data points in the training set. In this case, the non-linear boundary is used to classify test data (e.g., historical information) into a particular class (e.g., a class indicating that particular historical information is associated with a particular score for a particular test issue).

Additionally, or alternatively, the communication platform may train the first machine learning model using a supervised training procedure that includes receiving input to the model from a subject matter expert, which may reduce an amount of time, an amount of processing resources, and/or the like to train the first machine learning model relative to an unsupervised training procedure. In some implementations, the communication platform may use one or more other model training techniques, such as a neural network technique, a latent semantic indexing technique, and/or the like. For example, the communication platform may perform an artificial neural network processing technique (e.g., using a two-layer feedforward neural network architecture, a three-layer feedforward neural network architecture, and/or the like) to perform pattern recognition with regard to patterns of particular historical information associated with particular scores for particular test issues. In this case, using the artificial neural network processing technique may improve an accuracy of the first machine learning model generated by the communication platform by being more robust to noisy, imprecise, or incomplete data, and by enabling the communication platform to detect patterns and/or trends undetectable to human analysts or systems using less complex techniques.

In some implementations, a different device, such as the server device, may generate and train the first machine learning model. The different device may send the first machine learning model to the communication platform. The different device may update and send (e.g., on a scheduled basis, on an on-demand basis, on a triggered basis, and/or the like) the first machine learning model to the communication platform.

Accordingly, the communication platform may use artificial intelligence techniques, machine learning techniques, deep learning techniques, and/or the like to determine an association between historical information and a predicted score for a test issue.

In some implementations, the communication platform may select, identify, determine, and/or the like the test issue using the first machine learning model. For example, the communication platform may determine historical information concerning the customer service representative and process the historical information using the first machine learning model to determine scores for the plurality of test issues. The scores for the plurality of test issues may include a score for the test issue. The communication platform may select, identify, determine, and/or the like the test issue based on the score for the test issue. For example, the communication platform may select the test issue because the score for the test issue is lower than the respective scores of the other test issues of the plurality of test issues, which may indicate that the customer service representative likely needs to be tested concerning the test issue before being tested concerning the other test issues.

In some implementations, the communication platform may select, identify, determine, and/or the like the customer service representative and/or the user device before selecting, identifying, determining, and/or the like the test issue (e.g., as shown in FIG. 1A and by reference numbers 106 and 108), but in some implementations the communication platform may select, identify, determine, and/or the like the test issue before selecting, identifying, determining, and/or the like the customer service representative and/or user device. In some implementations, the communication platform may select, identify, determine, and/or the like the customer service representative and/or the user device based on the information concerning the test issue, the information concerning the plurality of customer service representatives, and/or the information concerning the plurality of user devices. For example, the communication platform may select the customer service representative and/or the user device because the information concerning the customer service representative and/or the information concerning the user device indicates that the customer service representative addressed a similar issue to the test issue and did not perform well.

In some implementations, the communication platform may select, identify, determine, and/or the like the customer service representative and/or the user device using a second machine learning model. In some implementations, the communication platform may receive, generate, and/or train the second machine learning model in a similar manner as described herein in relation to the first machine learning model. For example, the communication platform may obtain the historical information to generate and/or train the second machine learning model. In some implementations, the communication platform may process the historical information to train the second machine learning model to predict, for a test issue, respective scores concerning the plurality of customer service representatives and/or the plurality of user devices. A predicted score for a customer service representative and/or a user device may indicate a predicted performance of the customer service representative concerning the test issue (e.g., a low predicted score may indicate a predicted poor performance, a high predicted score may indicate a predicted good performance, and/or the like). In some implementations, the communication platform may perform a set of data manipulation procedures, perform a training operation, use a classification technique, perform a recursive feature elimination procedure, and/or the like as described herein to determine an association between a test issue and a predicted score for a customer service representative and/or user device.

In some implementations, the communication platform may select, identify, determine, and/or the like the customer service representative and/or the user device using the second machine learning model. For example, the communication platform may use the second machine learning model to determine, based on the test issue and/or the information concerning the plurality of user devices, scores for the plurality of user devices. The communication platform may select the user device, of the plurality of user devices, because the score for the test issue is lower than the respective scores of the other user devices of the plurality of user devices, which may indicate that the user device is available to be tested, the customer service representative associated with user device likely needs to be tested concerning the test issue, and/or the like.

As shown in FIG. 1B and by reference number 110, the communication platform may select, identify, determine, and/or the like a virtual assistant, of the one or more virtual assistants, to converse with the customer service representative. The communication platform may select the virtual assistant based on the test issue, the information concerning the customer service representative, the customer service representative, the user device, the information concerning the user device, and/or the like. The virtual assistant may have one or more voice characteristics that are different from one or more voice characteristics of another virtual assistant of the one or more virtual assistants. For example, the one or more voice characteristics may include a rate of speech, a cadence, a loudness, a timbre, a language, a dialect, an accent, a grammar, and/or the like.

As shown by reference number 112, the communication platform may initiate a communication session with the user device. For example, the communication platform may determine, based on the information concerning the customer service representative, that the user device is associated with the customer service representative and may send a message to the user device (e.g., call a telephone number associated with the user device) to initiate the communication session. In some implementations, the communication platform may initiate the communication session based on an availability of the customer service representative. For example, the communication platform may determine the availability of the customer service representative based on the information concerning the customer service representative and initiate the communication session at a time when the customer service representative is available.

As shown by reference number 114, the communication platform may communicate with the user device via the communication session based on the test issue. For example, the communication platform, using the virtual assistant, may communicate with the user device (e.g., the communication platform may cause the virtual assistant to converse with the customer service representative via the user device) regarding the test issue. For example, the communication platform may generate and send, based on the test issue, first voice data (e.g., one or more words generated by the virtual assistant) to the user device; receive, after sending the first voice data, second voice data (e.g., one or more words uttered by the customer service representative obtained by a microphone of the user device) from the user device; and/or generate and send, based on the second voice data and the test issue, third voice data (e.g., one or more additional words generated by the virtual assistant) to the user device.

Additionally, or alternatively, the communication platform may receive a first communication, such as first voice data (e.g., one or more words spoken by the customer service representative obtained by a microphone of the user device), first text data (e.g., one or more words entered into the user device by the customer service representative via a user interface of the user device), first video data (e.g., one or more images of the customer service representative obtained by a camera of the user device), and/or the like from the user device. The communication platform may process the first communication (e.g., using a voice-to-text technique, a natural language processing technique, a facial recognition technique, and/or the like) to determine a content of the first communication. The content of the first communication may be one or more words, one or more sentiments, and/or the like of the first communication.

In some implementations, the communication platform may process, based on the test issue, the content of the first communication to determine a response to the first communication. The communication platform may generate a second communication, such as second voice data, second text data, second video data, and/or the like based on the response (e.g., using an audio generation technique, a text-to-speech technique, a video generation technique, and/or the like). For example, the communication platform may generate, based on the response, second voice data using the one or more voice characteristics of the virtual assistant. The communication platform may send the second communication to the user device via the communication session.

Additionally, or alternatively, the communication platform may process the response to obtain a different response that uses one or more words that are different than words used in the response. Further, the communication platform may generate the second communication based on the different response instead of the response. In this way, the communication platform can provide variability in how the communication platform communicates with the customer service representative, which may provide a more natural interaction with the customer service representative. For example, where the customer service representative may ask a series of yes-or-no questions, the communication platform may generate responses that say "yes" in different ways (e.g., "yeah," "yep," "correct," "right," "that's right," "affirmative," and/or the like) or "no" in different ways (e.g., "nay," "negative," "incorrect," "wrong," "nope" and/or the like).

As shown in FIG. 1C and by reference number 116, the communication platform may obtain data concerning a performance of the customer service representative during the communication session. For example, the communication platform may obtain the data based on the virtual assistant conversing with the customer service representative. The data may include one or more data points, such as one or more data points concerning a sentiment of the customer service representative, a number of words used by the customer service representative, a length of the performance, an efficiency of the performance (e.g., whether the customer service representative had to put the call on hold), an outcome of the performance (e.g., whether a goal of the call was achieved), and/or the like. Additionally, or alternatively, the data may include voice data communicated between the virtual assistant and the user device.

As shown by reference number 118, the communication platform may determine a performance score of the customer service representative based on the data. The performance score may indicate whether the customer service representative performed poorly, performed well, and/or the like. In some implementations, the communication platform may process the data and/or at least one data point of the one or more data points to determine the performance score. For example, the communication platform may process the data and/or the at least one data point to determine vocal expressions received from the user device. The communication platform may determine, based on the data and/or the at least one data point, a percentage of the vocal expressions that conformed to a set of vocal expressions. The set of vocal expressions may be a set of approved vocal expressions associated with the test issue (e.g., one or more approved vocal expressions associated with a customer service representative script concerning the test issue). The communication platform may determine the performance score of the customer service representative based on the percentage of the vocal expressions that conformed to the set of vocal expressions. For example, the communication platform may determine a low performance score (e.g., a performance score that indicates the customer service representative performed poorly) if the percentage does not satisfy a threshold (e.g., the percentage is less than the threshold), a high performance score (e.g., a performance score that indicates the customer service representative performed well) if the percentage satisfies the threshold (e.g., the percentage is greater than or equal to the threshold), and/or the like.

In some implementations, the communication platform may use a third machine learning model to determine the performance score. In some implementations, the communication platform may receive, generate, and/or train the third machine learning model in a similar manner as described herein in relation to the first machine learning model and the second machine learning model. For example, the communication platform may obtain historical data and/or data points relating to performance of the plurality of customer service representatives during a plurality of communication sessions (hereinafter referred to as the "historical data information") to generate and/or train the third machine learning model. In some implementations, the communication platform may process the historical data information to train the third machine learning model to predict, for particular historical data information, a performance score. A predicted performance score may indicate a predicted performance concerning the test issue (e.g., a low predicted performance score may indicate a predicted poor performance, a high predicted performance score may indicate a predicted good performance, and/or the like). In some implementations, the communication platform may perform a set of data manipulation procedures, perform a training operation, use a classification technique, perform a recursive feature elimination procedure, and/or the like as described herein to determine an association between data and/or data points and a predicted performance score.

In some implementations, the communication platform may use the third machine learning model to process the data and/or the at least one data point to determine the performance score. For example, the communication platform may process the data to determine particular words used by the customer service representative during the communication session. The communication platform may determine, using the third machine learning model, the performance score for the customer service representative based on the particular words used by the customer service representative.

As shown by reference number 120, the communication platform may cause at least one action to be performed based on the performance score. For example, the communication platform may send training information, or cause the training information to be sent, to the user device when the performance score does not satisfy a threshold (e.g., the performance score is less than the threshold, which may indicate that the customer service representative did not perform well, needs additional training, and/or the like). In some implementations, the communication platform may obtain, based on the test issue and/or the performance score, the training information from a different device, such as the server device. For example, the communication platform may obtain training information that concerns the test issue from the different device. In some implementations, the communication platform may generate the training information based on the data and/or the at least one data point, the test issue, and/or the performance score. For example, the communication platform may generate training information that is specific to the performance of the customer service representative and/or includes personalized tips or other information concerning how the customer service representative can improve the customer service representative's performance in relation to the test issue. The communication platform may send the training information, or cause the training information to be sent, to the user device. This may allow the customer service representative to access the training information via the user device.

In some implementations, the communication platform may determine an availability of a transmission resource of the communication platform and/or an availability of a reception resource of the user device and send the training information, or cause the training information to be sent, to the user device based on the availability of the transmission resource of the communication platform and/or the availability of the reception resource of the user device. In this way, the communication platform may facilitate delivery of the training information to the user device in an efficient manner (e.g., when the both the communication platform and the user device are available).

In an additional example, the communication platform may determine that the performance score for the customer service representative does not satisfy a threshold and may process, based on the performance score for the customer service representative not satisfying the threshold, the data to create a transcription of the voice data communicated between the virtual assistant and the user device. The communication platform may send the transcription to the user device. As another example, the communication platform may cause a different virtual assistant (e.g., a virtual assistant other than the virtual assistant used by the communication platform to communicate with the user device)

to be trained using one or more of the performance score, the plurality of data points, the test issue, the information identifying the customer service representative, the first machine learning model, the second machine learning model, the third machine learning model, the training information, and/or the like. The different virtual assistant may perform one or more of the same functions and/or tasks of the customer service representative (e.g., the different virtual assistant may be a customer service chatbot available through a website of the organization) and the communication platform may cause the different virtual assistant to be updated to emulate (or not emulate) the performance of the customer service representative.

In another example, the communication platform may cause the first machine learning model, the second machine learning model, and/or the third machine learning model to be updated based on the data, the at least one data point, the performance score, the test issue, the information identifying the customer service representative, the information identifying the user device, the virtual assistant, information regarding the virtual assistant, the training information, and/or the like.

As indicated above, FIGS. 1A-1C are provided merely as an example. Other examples may differ from what is described with regard to FIGS. 1A-1C.

Figure 2:
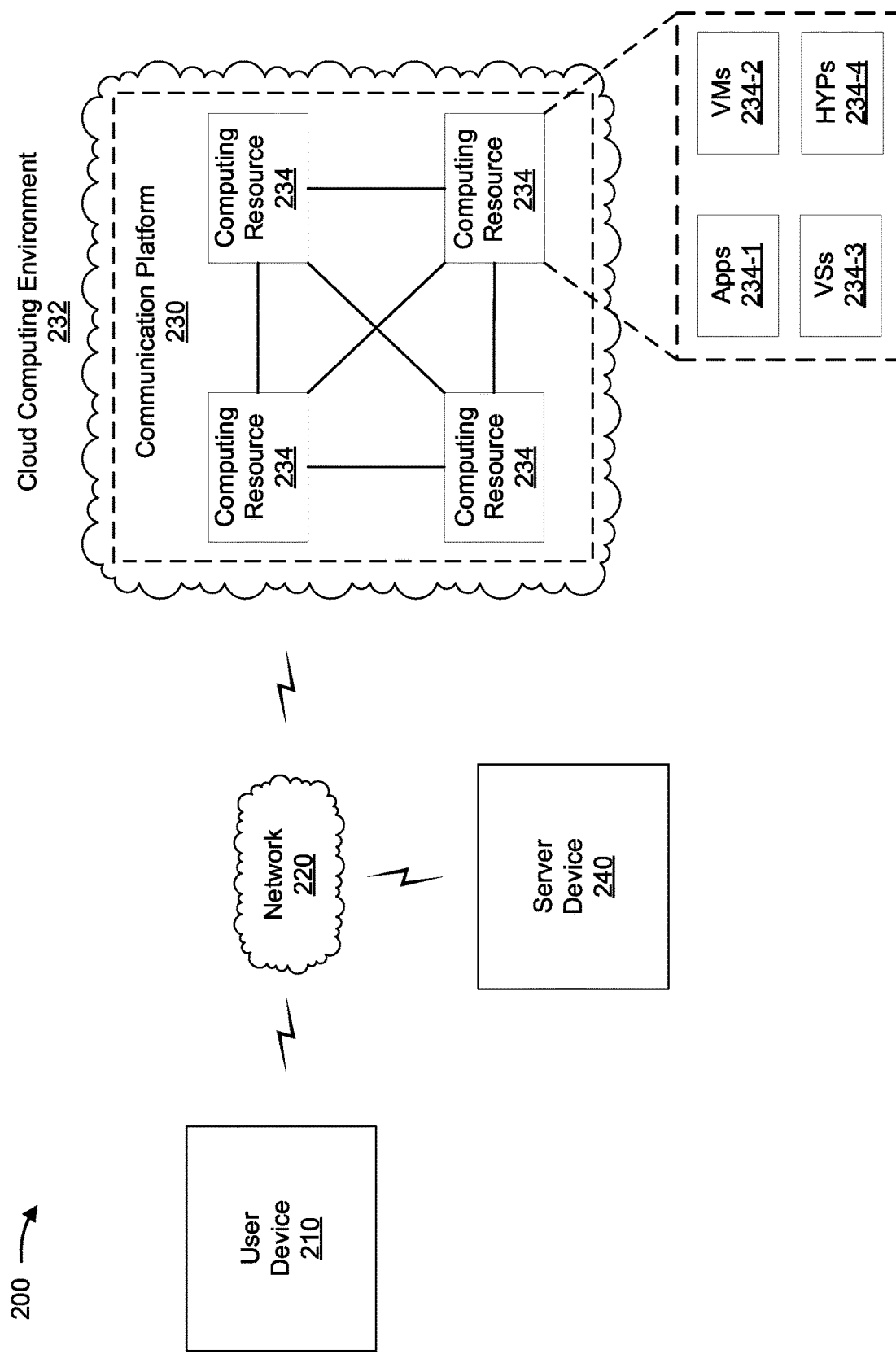
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a network 220, a communication platform 230 in a cloud computing environment 232 that includes computing resources 234, a server device 240, and/or the like. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a computer (e.g., a desktop computer, a laptop computer, a tablet computer, a handheld computer, a server device, etc.), a mobile phone (e.g., a smart phone, a radiotelephone, etc.), an internet of things (IoT) device or smart appliance, or a similar device. In some implementations, user device 210 may receive information from and/or transmit information to communication platform 230, and/or the like.

Network 220 includes one or more wired and/or wireless networks. For example, network 220 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the internet, a fiber optic-based network, a cloud computing network, a mesh network and/or the like, and/or a combination of these or other types of networks.

Communication platform 230 includes one or more devices capable of interacting with a user device to provide automated testing of a customer service representative. Communication platform 230 may obtain information concerning a plurality of customer service representatives, a plurality of user devices, and/or a plurality test issues from server device 240, and/or select a customer service representative, a user device, and/or a test issue. Additionally, communication platform 230 may select a virtual assistant to converse with the customer service representative, initiate a communication session with user device 210, communicate with user device 210 via the communication session, obtain data concerning a performance of the customer service representative based on communicating with user device 210, determine a performance score of the customer service representative, cause an action to be performed, and/or the like.

In some implementations, communication platform 230 may be designed to be modular such that certain software components may be swapped in or out depending on a particular need. As such, communication platform 230 may be easily and/or quickly reconfigured for different uses. In some implementations, communication platform 230 may receive information from and/or transmit information to user device 210 and/or server device 240, such as via network 220.

In some implementations, as shown, communication platform 230 may be hosted in a cloud computing environment 232. Notably, while implementations described herein describe communication platform 230 as being hosted in cloud computing environment 232, in some implementations, communication platform 230 may be non-cloud-based (i.e., may be implemented outside of a cloud computing environment) or may be partially cloud-based.

Cloud computing environment 232 includes an environment that hosts communication platform 230. Cloud computing environment 232 may provide computation, software, data access, storage, etc. services that do not require end-user knowledge of a physical location and configuration of system(s) and/or device(s) that hosts communication platform 230. As shown, cloud computing environment 232 may include a group of computing resources 234 (referred to collectively as "computing resources 234" and individually as "computing resource 234").

Computing resource 234 includes one or more personal computers, workstation computers, server devices, or other types of computation and/or communication devices. In some implementations, computing resource 234 may host communication platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 includes a group of cloud resources, such as one or more applications ("APPs") 234-1, one or more virtual machines ("VMs") 234-2, virtualized storage ("VSs") 234-3, one or more hypervisors ("HYPs") 234-4, and/or the like.

Application 234-1 includes one or more software applications that may be provided to or accessed by user device 210 and/or server device 240. Application 234-1 may eliminate a need to install and execute the software applications on user device 210 and/or server device 240. For example, application 234-1 may include software associated with communication platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of user device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 may provide hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Server device 240 includes one or more devices capable of receiving, generating, storing, processing, and/or providing information, such as information described herein. For example, server device 240 may include a laptop computer, a tablet computer, a desktop computer, a server, a group of servers, or a similar type of device. In some implementations, server device 240 may receive information from and/or transmit information to user device 210 and/or communication platform 230.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
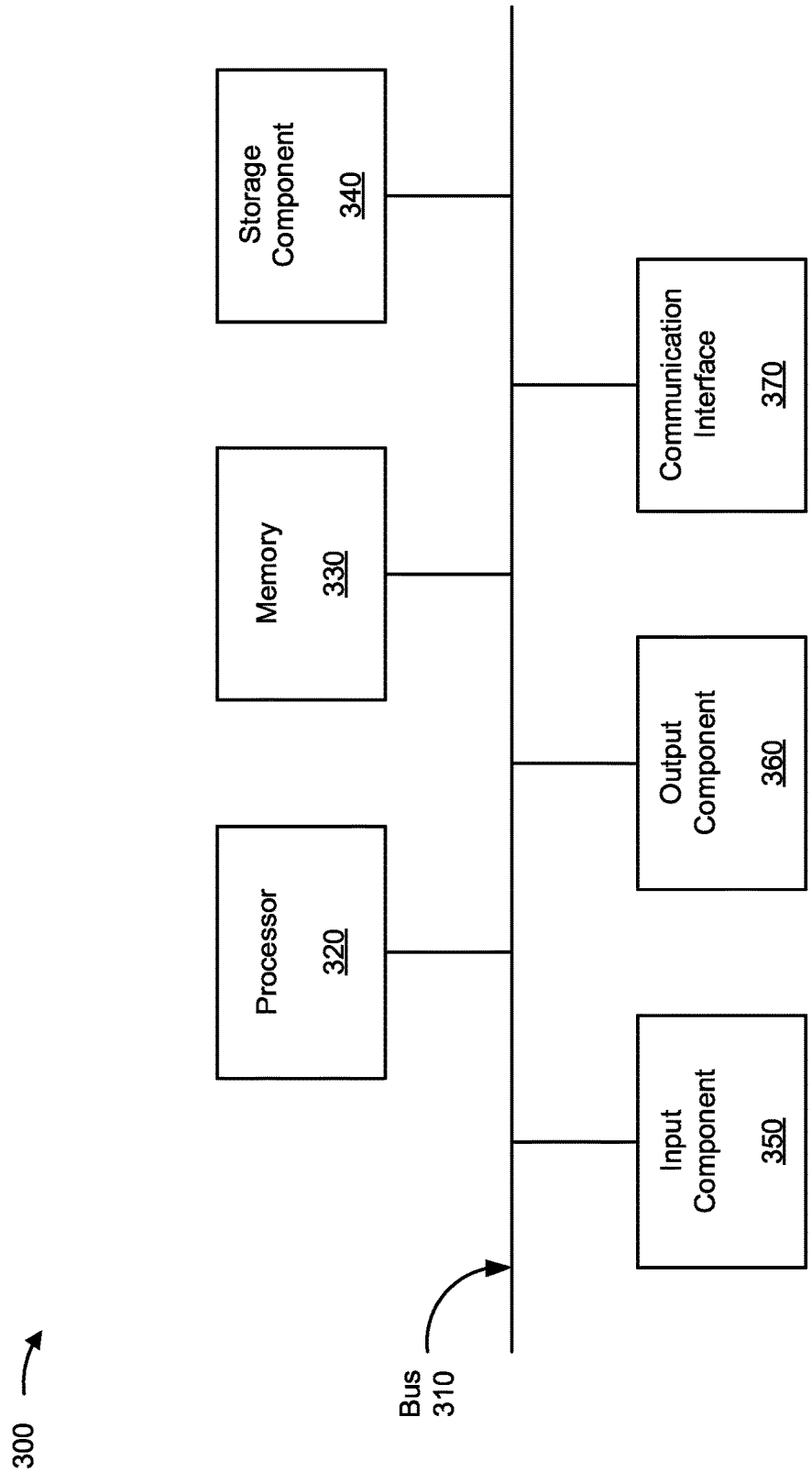
FIG. 3 is a diagram of example components of one or more devices of FIG. 2.

FIG. 3 is a diagram of example components of a device 300. Device 300 may correspond to user device 210, communication platform 230, computing resource 234, server device 240, and/or the like. In some implementations, user device 210, communication platform 230, computing resource 234, server device 240, and/or the like may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
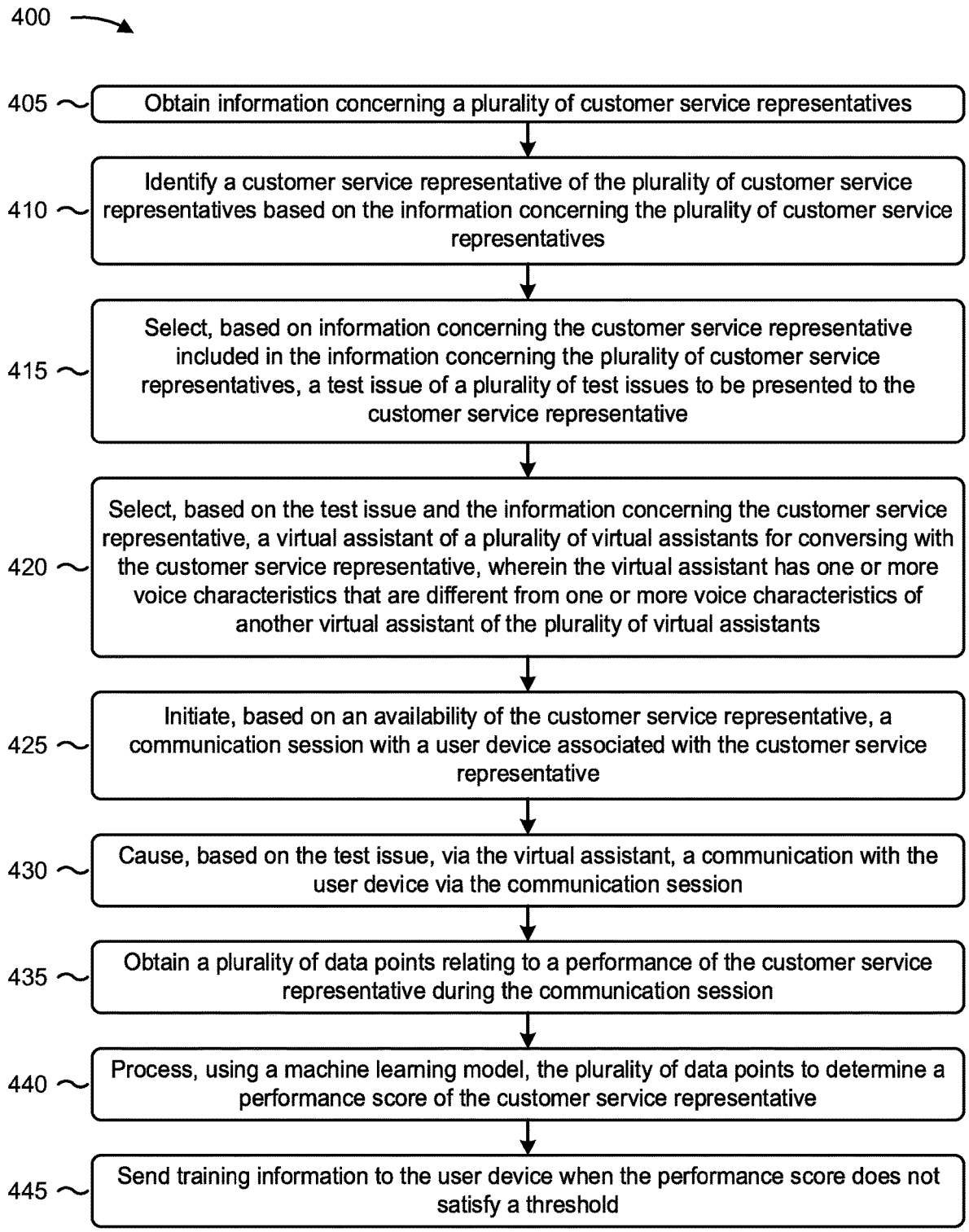
FIGS. 4-6 are flow charts of example processes for interacting with a user device to provide automated testing of a customer service representative.

FIG. 4 is a flow chart of an example process 400 for interacting with a user device to provide automated testing of a customer service representative. In some implementations, one or more process blocks of FIG. 4 may be performed by a communication platform (e.g., communication platform 230). In some implementations, one or more process blocks of FIG. 4 may be performed by another device or a group of devices separate from or including the communication platform, such as a user device (e.g., user device 210), a server device (e.g., server device 240), and/or the like.

As shown in FIG. 4, process 400 may include obtaining information concerning a plurality of customer service representatives (block 405). For example, the communication platform (e.g., using computing resource 234, processor 320, memory 330, storage component 340, input component 350, communication interface 370, and/or the like) may obtain information concerning a plurality of customer service representatives, as described above.

As further shown in FIG. 4, process 400 may include identifying a customer service representative of the plurality of customer service representatives based on the information concerning the plurality of customer service representatives (block 410). For example, the communication platform (e.g., using computing resource 234, processor 320, memory 330, storage component 340, communication interface 370, and/or the like) may identify a customer service representative of the plurality of customer service representatives based on the information concerning the plurality of customer service representatives, as described above.

As further shown in FIG. 4, process 400 may include selecting, based on information concerning the customer service representative included in the information concerning the plurality of customer service representatives, a test issue of a plurality of test issues to be presented to the customer service representative (block 415). For example, the communication platform (e.g., using computing resource 234, processor 320, memory 330, storage component 340, and/or the like) may select, based on information concerning the customer service representative included in the information concerning the plurality of customer service representatives, a test issue of a plurality of test issues to be presented to the customer service representative, as described above.

As further shown in FIG. 4, process 400 may include selecting, based on the test issue and the information concerning the customer service representative, a virtual assistant of a plurality of virtual assistants for conversing with the customer service representative, wherein the virtual assistant has one or more voice characteristics that are different from one or more voice characteristics of another virtual assistant of the plurality of virtual assistants (block 420). For example, the communication platform (e.g., using computing resource 234, processor 320, memory 330, storage component 340, and/or the like) may select, based on the test issue and the information concerning the customer service representative, a virtual assistant of a plurality of virtual assistants for conversing with the customer service representative, as described above. In some implementations, the virtual assistant may have one or more voice characteristics that are different from one or more voice characteristics of another virtual assistant of the plurality of virtual assistants.

As further shown in FIG. 4, process 400 may include initiating, based on an availability of the customer service representative, a communication session with a user device associated with the customer service representative (block 425). For example, the communication platform (e.g., using computing resource 234, processor 320, memory 330, storage component 340, communication interface 370, and/or the like) may initiate, based on an availability of the customer service representative, a communication session with a user device associated with the customer service representative, as described above.

As further shown in FIG. 4, process 400 may include causing, based on the test issue, via the virtual assistant, a communication with the user device via the communication session (block 430). For example, the communication platform (e.g., using computing resource 234, processor 320, memory 330, storage component 340, input component 350, output component 360, communication interface 370, and/or the like) may cause, based on the test issue, via the virtual assistant, a communication with the user device via the communication session, as described above.

As further shown in FIG. 4, process 400 may include obtaining a plurality of data points relating to a performance of the customer service representative during the communication session (block 435). For example, the communication platform (e.g., using computing resource 234, processor 320, memory 330, storage component 340, input component 350, communication interface 370, and/or the like) may obtain a plurality of data points relating to a performance of the customer service representative during the communication session, as described above.

As further shown in FIG. 4, process 400 may include processing, using a machine learning model, the plurality of data points to determine a performance score of the customer service representative (block 440). For example, the communication platform (e.g., using computing resource 234, processor 320, memory 330, storage component 340, and/or the like) may process, using a machine learning model, the plurality of data points to determine a performance score of the customer service representative, as described above.

As further shown in FIG. 4, process 400 may include sending training information to the user device when the performance score does not satisfy a threshold (block 445). For example, the communication platform (e.g., using computing resource 234, processor 320, memory 330, storage component 340, output component 360, communication interface 370, and/or the like) may send training information to the user device when the performance score does not satisfy a threshold, as described above.

Process 400 may include additional implementations, such as any single implementation or any combination of implementations described below and/or in connection with one or more other processes described elsewhere herein.

In some implementations, when identifying the customer service representative of the plurality of customer service representatives, the communication platform may determine, based on the information concerning the plurality of customer service representatives, a respective measure of availability of each customer service representative of the plurality of customer service representatives, and may identify, based on the respective measure of availability of each customer service representative of the plurality of customer service representatives, the customer service representative.

In some implementations, the machine learning model may be a first machine learning model, and, when selecting the test issue, the communication platform may determine historical information concerning the customer service representative, may process the historical information, using a second machine learning model, to determine scores for the plurality of test issues, where the scores for the plurality of test issues includes a score for the test issue, and may select the test issue based on the score for the test issue.

In some implementations, when causing the communication with the user device via the communication session, the communication platform may receive first voice data from the user device, may determine one or more words of the first voice data using a voice-to-text technique, may process the one or more words to determine a response, may generate, based on the response, second voice data using the one or more voice characteristics of the virtual assistant, and may send the second voice data to the user device.

In some implementations, when causing the communication with the user device via the communication session, the communication platform may receive first voice data from the user device, may determine, based on the first voice data and the test issue, a response, and may process the response to obtain a different response, where the different response uses one or more words that are different than words used in the response. Additionally, the communication platform may generate, based on the different response, second voice data, and may send the second voice data to the user device.

In some implementations, when processing the plurality of data points to determine the performance score of the customer service representative, the communication platform may process the plurality of data points to determine vocal expressions received from the user device, may determine, based on the plurality of data points, a percentage of the vocal expressions that conformed to a set of vocal expressions, and may determine the performance score of the customer service representative based on the percentage of the vocal expressions that conformed to the set of vocal expressions.

In some implementations, when sending the training information to the user device, the communication platform may obtain, based on the performance score of the customer service representative, particular training information concerning the test issue, and may send the particular training information to the user device. In some implementations, the communication platform may cause a different virtual assistant to be trained using one or more of the performance score, the plurality of data points, the test issue, the information identifying the customer service representative, the machine learning model, or the training information.

In some implementations, the communication platform may cause the machine learning model to be updated based on one or more of the plurality of data points, the performance score, the test issue, the information identifying the customer service representative, information identifying the user device, the virtual assistant, or the training information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
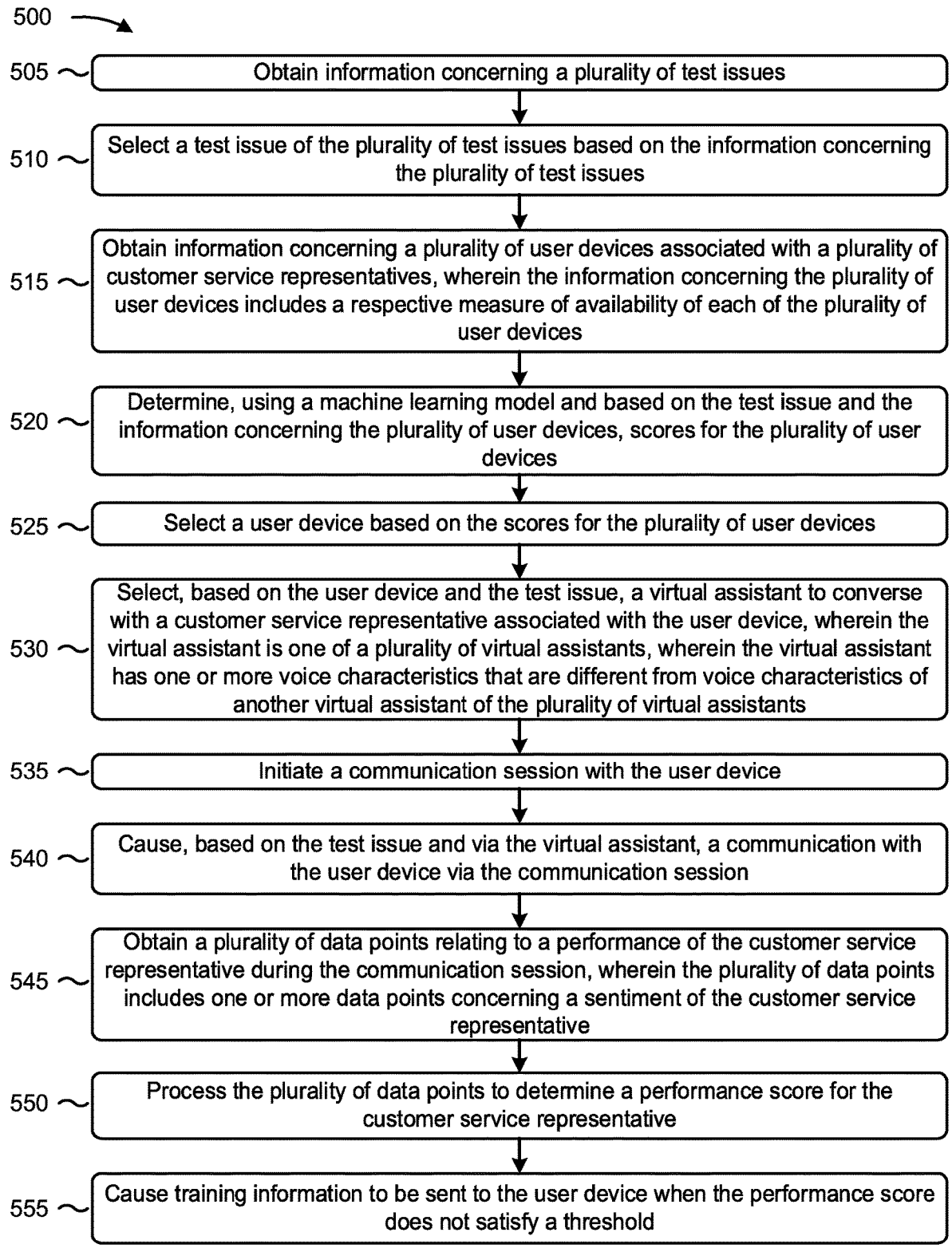

FIG. 5 is a flow chart of an example process 500 for interacting with a user device to provide automated testing of a customer service representative. In some implementations, one or more process blocks of FIG. 5 may be performed by a communication platform (e.g., communication platform 230). In some implementations, one or more process blocks of FIG. 5 may be performed by another device or a group of devices separate from or including the communication platform, such as a user device (e.g., user device 210), a server device (e.g., server device 240), and/or the like.

As shown in FIG. 5, process 500 may include obtaining information concerning a plurality of test issues (block 505). For example, the communication platform (e.g., using computing resource 234, processor 320, memory 330, storage component 340, input component 350, communication interface 370, and/or the like) may obtain information concerning a plurality of test issues, as described above.

As further shown in FIG. 5, process 500 may include selecting a test issue of the plurality of test issues based on the information concerning the plurality of test issues (block 510). For example, the communication platform (e.g., using computing resource 234, processor 320, memory 330, storage component 340, and/or the like) may select a test issue of the plurality of test issues based on the information concerning the plurality of test issues, as described above.

As further shown in FIG. 5, process 500 may include obtaining information concerning a plurality of user devices associated with a plurality of customer service representatives, wherein the information concerning the plurality of user devices includes a respective measure of availability of each of the plurality of user devices (block 515). For example, the communication platform (e.g., using computing resource 234, processor 320, memory 330, storage component 340, input component 350, communication interface 370, and/or the like) may obtain information concerning a plurality of user devices associated with a plurality of customer service representatives, as described above. In some implementations, the information concerning the plurality of user devices includes a respective measure of availability of each of the plurality of user devices.

As further shown in FIG. 5, process 500 may include determining, using a machine learning model and based on the test issue and the information concerning the plurality of user devices, scores for the plurality of user devices (block 520). For example, the communication platform (e.g., using computing resource 234, processor 320, memory 330, storage component 340, and/or the like) may determine, using a machine learning model and based on the test issue and the information concerning the plurality of user devices, scores for the plurality of user devices, as described above.

As further shown in FIG. 5, process 500 may include selecting a user device based on the scores for the plurality of user devices (block 525). For example, the communication platform (e.g., using computing resource 234, processor 320, memory 330, storage component 340, and/or the like) may select a user device based on the scores for the plurality of user devices, as described above.

As further shown in FIG. 5, process 500 may include selecting, based on the user device and the test issue, a virtual assistant to converse with a customer service representative associated with the user device, wherein the virtual assistant is one of a plurality of virtual assistants, wherein the virtual assistant has one or more voice characteristics that are different from voice characteristics of another virtual assistant of the plurality of virtual assistants (block 530). For example, the communication platform (e.g., using computing resource 234, processor 320, memory 330, storage component 340, and/or the like) may select, based on the user device and the test issue, a virtual assistant to converse with a customer service representative associated with the user device, as described above. In some implementations, the virtual assistant may be one of a plurality of virtual assistants, wherein the virtual assistant has one or more voice characteristics that are different from voice characteristics of another virtual assistant of the plurality of virtual assistants.

As further shown in FIG. 5, process 500 may include initiating a communication session with the user device (block 535). For example, the communication platform (e.g., using computing resource 234, processor 320, memory 330, storage component 340, communication interface 370, and/or the like) may initiate a communication session with the user device, as described above.

As further shown in FIG. 5, process 500 may include causing, based on the test issue and via the virtual assistant, a communication with the user device via the communication session (block 540). For example, the communication platform (e.g., using computing resource 234, processor 320, memory 330, storage component 340, input component 350, output component 360, communication interface 370, and/or the like) may cause, based on the test issue and via the virtual assistant, a communication with the user device via the communication session, as described above.

As further shown in FIG. 5, process 500 may include obtaining a plurality of data points relating to a performance of the customer service representative during the communication session, wherein the plurality of data points includes one or more data points concerning a sentiment of the customer service representative (block 545). For example, the communication platform (e.g., using computing resource 234, processor 320, memory 330, storage component 340, input component 350, communication interface 370, and/or the like) may obtain a plurality of data points relating to a performance of the customer service representative during the communication session, as described above. In some implementations, the plurality of data points may include one or more data points concerning a sentiment of the customer service representative.

As further shown in FIG. 5, process 500 may include processing the plurality of data points to determine a performance score for the customer service representative (block 550). For example, the communication platform (e.g., using computing resource 234, processor 320, memory 330, storage component 340, input component 350, communication interface 370, and/or the like) may process the plurality of data points to determine a performance score for the customer service representative, as described above.

As further shown in FIG. 5, process 500 may include causing training information to be sent to the user device when the performance score does not satisfy a threshold (block 555). For example, the communication platform (e.g., using computing resource 234, processor 320, memory 330, storage component 340, input component 350, communication interface 370, and/or the like) may cause training information to be sent to the user device when the performance score does not satisfy a threshold, as described above.

Process 500 may include additional implementations, such as any single implementation or any combination of implementations described below and/or in connection with one or more other processes described elsewhere herein.

In some implementations, the machine learning model may be a first machine learning model, and, when processing the plurality of data points, the communication platform may process the plurality of data points, using a second machine learning model, to determine the performance score for the customer service representative, where the second machine learning model has been trained to determine performance scores for customer service representatives based on historical data points relating to performance of the plurality of customer service representatives during a plurality of communication sessions.

In some implementations, when selecting the virtual assistant, the communication platform may obtain information concerning the customer service representative associated with the user device, and may select the virtual assistant based on the information concerning the customer service representative.

In some implementations, when causing the communication with the user device via the communication session, the communication platform may generate, based on the test issue and using the virtual assistant, first voice data; may send the first voice data to the user device; may receive, after sending the first voice data, second voice data from the user device; may generate, based on the second voice data, based on the test issue, and using the virtual assistant, third voice data; and may send the third voice data to the user device.

In some implementations, when causing the training information to be sent to the user device, the communication platform may determine an availability of a transmission resource of the device, may determine an availability of a reception resource of the user device, and may send, based on the availability of the transmission resource of the device and the availability of the reception resource of the user device, the training information to the user device.

In some implementations, when sending the training information to the user device, the communication platform may generate, based on the plurality of data points and the test issue, the training information, and may cause the training information to be sent for access by the customer service representative via the user device.

In some implementations, the communication platform may cause the machine learning model to be updated based on one or more of the plurality of data points, the performance score, the test issue, information identifying the customer service representative, information identifying the user device, information regarding the virtual assistant, or the training information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
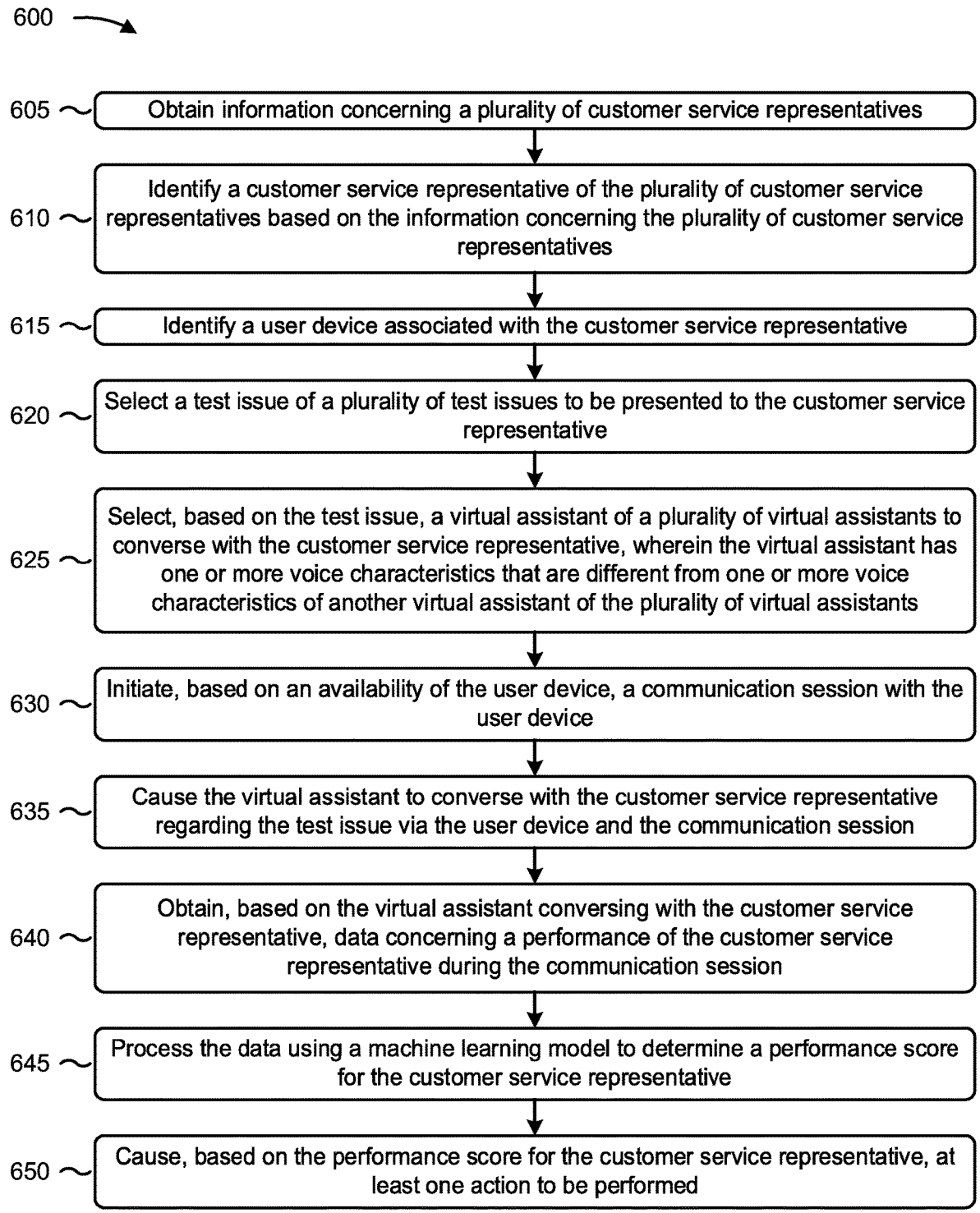

FIG. 6 is a flow chart of an example process 600 for interacting with a user device to provide automated testing of a customer service representative. In some implementations, one or more process blocks of FIG. 6 may be performed by a communication platform (e.g., communication platform 230). In some implementations, one or more process blocks of FIG. 6 may be performed by another device or a group of devices separate from or including the communication platform, such as a user device (e.g., user device 210), a server device (e.g., server device 240), and/or the like.

As shown in FIG. 6, process 600 may include obtaining information concerning a plurality of customer service representatives (block 605). For example, the communication platform (e.g., using computing resource 234, processor 320, memory 330, storage component 340, input component 350, communication interface 370, and/or the like) may obtain information concerning a plurality of customer service representatives, as described above.

As further shown in FIG. 6, process 600 may include identifying a customer service representative of the plurality of customer service representatives based on the information concerning the plurality of customer service representatives (block 610). For example, the communication platform (e.g., using computing resource 234, processor 320, memory 330, storage component 340, and/or the like) may identify a customer service representative of the plurality of customer service representatives based on the information concerning the plurality of customer service representatives, as described above.

As further shown in FIG. 6, process 600 may include identifying a user device associated with the customer service representative (block 615). For example, the communication platform (e.g., using computing resource 234, processor 320, memory 330, storage component 340, and/or the like) may identify a user device associated with the customer service representative, as described above.

As further shown in FIG. 6, process 600 may include selecting a test issue of a plurality of test issues to be presented to the customer service representative (block 620). For example, the communication platform (e.g., using computing resource 234, processor 320, memory 330, storage component 340, and/or the like) may select a test issue of a plurality of test issues to be presented to the customer service representative, as described above.

As further shown in FIG. 6, process 600 may include selecting, based on the test issue, a virtual assistant of a plurality of virtual assistants to converse with the customer service representative, wherein the virtual assistant has one or more voice characteristics that are different from one or more voice characteristics of another virtual assistant of the plurality of virtual assistants (block 625). For example, the communication platform (e.g., using computing resource 234, processor 320, memory 330, storage component 340, and/or the like) may select, based on the test issue, a virtual assistant of a plurality of virtual assistants to converse with the customer service representative, as described above. In some implementations, the virtual assistant may have one or more voice characteristics that are different from one or more voice characteristics of another virtual assistant of the plurality of virtual assistants.

As further shown in FIG. 6, process 600 may include initiating, based on an availability of the user device, a communication session with the user device (block 630). For example, the communication platform (e.g., using computing resource 234, processor 320, memory 330, storage component 340, communication interface 370, and/or the like) may initiate, based on an availability of the user device, a communication session with the user device, as described above.

As further shown in FIG. 6, process 600 may include causing the virtual assistant to converse with the customer service representative regarding the test issue via the user device and the communication session (block 635). For example, the communication platform (e.g., using computing resource 234, processor 320, memory 330, storage component 340, input component 350, output component 360, communication interface 370, and/or the like) may cause the virtual assistant to converse with the customer service representative regarding the test issue via the user device and the communication session, as described above.

As further shown in FIG. 6, process 600 may include obtaining, based on the virtual assistant conversing with the customer service representative, data concerning a performance of the customer service representative during the communication session (block 640). For example, the communication platform (e.g., using computing resource 234, processor 320, memory 330, storage component 340, input component 350, communication interface 370, and/or the like) may obtain, based on the virtual assistant conversing with the customer service representative, data concerning a performance of the customer service representative during the communication session, as described above.

As further shown in FIG. 6, process 600 may include processing the data using a machine learning model to determine a performance score for the customer service representative (block 645). For example, the communication platform (e.g., using computing resource 234, processor 320, memory 330, storage component 340, and/or the like) may process the data using a machine learning model to determine a performance score for the customer service representative, as described above.

As further shown in FIG. 6, process 600 may include causing, based on the performance score for the customer service representative, at least one action to be performed (block 650). For example, the communication platform (e.g., using computing resource 234, processor 320, memory 330, storage component 340, input component 350, communication interface 370, and/or the like) may cause, based on the performance score for the customer service representative, at least one action to be performed, as described above.

Process 600 may include additional implementations, such as any single implementation or any combination of implementations described below and/or in connection with one or more other processes described elsewhere herein.

In some implementations, when processing the data using the machine learning model to determine the performance score for the customer service representative, the communication platform may process the data to determine particular words used by the customer service representative during the communication session, and may determine, using the machine learning model, the performance score for the customer service representative based on the particular words used by the customer service representative.

In some implementations, the data may include voice data communicated between the virtual assistant and the user device, and, when causing the at least one action to be performed, the communication platform may determine that the performance score for the customer service representative does not satisfy a threshold, may process, based on the performance score for the customer service representative not satisfying the threshold, the data to create a transcription of the voice data communicated between the virtual assistant and the user device, and may send the transcription to the user device.

In some implementations, when causing the at least one action to be performed, the communication platform may cause the machine learning model to be updated based on information identifying the customer service representative, information identifying the user device, the test issue, information regarding the virtual assistant, the data concerning the performance of the customer service representative, or the performance score.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   selecting, by a device and based on a test issue, a first virtual assistant, of a plurality of virtual assistants, for conversing with a customer service representative;
   obtaining, by the device, a plurality of data points relating to a performance of the customer service representative during a communication session; and
   training, by the device and based on the plurality of data points and the test issue, a second virtual assistant to perform one or more functions of the customer service representative.

2. The method of claim 1, where the first virtual assistant has one or more voice characteristics that are different from one or more voice characteristics of the second virtual assistant.

3. The method of claim 2, wherein the one or more voice characteristics include one or more of:
   a rate of speech,
   a cadence,
   a loudness,
   a timbre,
   a language,
   a dialect,
   an accent, or
   grammar.

4. The method of claim 1, comprising:
   sending, based on the test issue, first voice data, generated by the first virtual assistant to a user device associated with the customer service representative;
   receiving, after sending the first voice data and from the user device, second voice data associated with the customer service representative; and
   sending, based on the second voice data and the test issue, third voice data generated by the first virtual assistant, to the user device.

5. The method of claim 1, where obtaining the plurality of data points relating to the performance of the customer service representative during the communication session comprises:
   obtaining the plurality of data points based on one or more of:
      one or more data points concerning a sentiment of the customer service representative,
      a quantity of words used by the customer service representative,
      a length of the performance,
      an efficiency of the performance, or
      an outcome of the performance.

6. The method of claim 1, where training the second virtual assistant to perform one or more functions of the customer service representative comprises:
   training the second virtual assistant using one or more of:
      a performance score,
      the plurality of data points,
      the test issue,
      information identifying the customer service representative,
      a machine learning model, or
      training information.

7. The method of claim 1, wherein the second virtual assistant performs one or more similar functions or tasks of the customer service representative,
   the second virtual assistant being a customer service chatbot available through a website of an organization.

8. A device, comprising:
one or more memories; and
one or more processors communicatively coupled to the one or more memories, configured to:
  select a first virtual assistant, of a plurality of virtual assistants, for conversing with a customer service representative;
  obtain a plurality of data points relating to a performance of the customer service representative during a communication session; and
  train, based on the plurality of data points, a second virtual assistant to perform one or more functions of the customer service representative.

9. The device of claim 8, wherein the one or more processors are further configured to:
  update the second virtual assistant to emulate the performance of the customer service representative.

10. The device of claim 8, wherein the one or more processors are further configured to:
  determine that the plurality of data points does not satisfy a threshold; and
  create, based on the plurality of data points not satisfying the threshold, a transcription of voice data communicated between the first virtual assistant and the customer service representative.

11. The device of claim 8, wherein the one or more processors are further configured to:
  send first voice data, generated by the first virtual assistant, to a user device associated with the customer service representative;
  receive, after sending the first voice data and from the user device, second voice data associated with the customer service representative; and
  send, based on the second voice data, third voice data generated by the first virtual assistant, to the user device.

12. The device of claim 8, wherein the one or more processors, when obtaining the plurality of data points relating to the performance of the customer service representative during the communication session, are to:
  obtain the plurality of data points based on one or more of:
    one or more data points concerning a sentiment of the customer service representative, or
    a quantity of words used by the customer service representative.

13. The device of claim 8, wherein the one or more processors, when training the second virtual assistant to perform the one or more functions of the customer service representative are to:
  train the second virtual assistant using one or more of:
    a performance score,
    a machine learning model, or
    training information.

14. The device of claim 8, wherein the second virtual assistant performs one or more similar functions or tasks of the customer service representative,
  the second virtual assistant being a customer service chatbot available through a web site of an organization.

15. A non-transitory computer-readable medium storing instructions, the instructions comprising:
one or more instructions that, when executed by one or more processors, cause the one or more processors to:
  select, based on a test issue, a first virtual assistant, of a plurality of virtual assistants, for conversing with a customer service representative;
  obtain a plurality of data points to determine a performance score of the customer service representative during a communication session; and
  train, based on the performance score and the test issue, a second virtual assistant to perform one or more functions of the customer service representative.

16. The non-transitory computer-readable medium of claim 15, wherein the one or more instructions, when executed by the one or more processors, further cause the one or more processors to:
  determine that the performance score for the customer service representative does not satisfy a threshold; and
  create, based on the performance score for the customer service representative not satisfying the threshold, a transcription of voice data communicated between the first virtual assistant and the customer service representative.

17. The non-transitory computer-readable medium of claim 15, wherein the one or more instructions, when executed by the one or more processors, further cause the one or more processors to:
  update the second virtual assistant to emulate the performance of the customer service representative.

18. The non-transitory computer-readable medium of claim 15, wherein the one or more instructions, when executed by the one or more processors, further cause the one or more processors to:
  send, based on the test issue, first voice data, generated by the first virtual assistant, to a user device associated with the customer service representative;
  receive, after sending the first voice data and from the user device, second voice data associated with the customer service representative; and
  send, based on the second voice data and the test issue, third voice data generated by the first virtual assistant, to the user device.

19. The non-transitory computer-readable medium of claim 15, wherein the one or more instructions, that cause the one or more processors to obtain the plurality of data points relating to the performance of the customer service representative during the communication session, cause the one or more processors to:
  obtain the plurality of data points based on one or more of:
    one or more data points concerning a sentiment of the customer service representative, or
    a quantity of words used by the customer service representative.

20. The non-transitory computer-readable medium of claim 15, wherein the second virtual assistant performs one or more similar functions or tasks of the customer service representative,
  the second virtual assistant being a customer service chatbot available through a website of an organization.

* * * * *